United States Patent [19]

Laurin

[11] 4,127,697
[45] Nov. 28, 1978

[54] ABRASION-RESISTANT LENSES AND PROCESS OF MAKING

[75] Inventor: Bernard L. Laurin, Ludlow, Mass.

[73] Assignee: American Optical Corporation, Southbridge, Mass.

[21] Appl. No.: 762,088

[22] Filed: Jan. 24, 1977

Related U.S. Application Data

[63] Continuation-in-part of Ser. No. 717,065, Aug. 24, 1976, Pat. No. 4,064,308, and a continuation-in-part of Ser. No. 578,793, May 19, 1975, abandoned.

[51] Int. Cl.² .................... G02B 1/10; G02C 7/02; B32B 7/02; B32B 27/06
[52] U.S. Cl. ........................... 428/412; 350/175 NG; 351/166; 428/409; 428/447; 428/913
[58] Field of Search .............. 428/412, 447, 409, 913; 351/166; 350/175 NG

[56] References Cited

U.S. PATENT DOCUMENTS

| | | | |
|---|---|---|---|
| 3,484,157 | 12/1969 | Crandon et al. | 351/166 |
| 3,953,115 | 4/1976 | French et al. | 428/412 |
| 3,971,872 | 7/1976 | Leboeuf | 351/166 X |
| 3,986,997 | 10/1976 | Clark | 428/412 |
| 4,006,271 | 2/1977 | French et al. | 351/166 X |
| 4,024,306 | 5/1977 | Takamizawa | 428/412 X |
| 4,027,072 | 5/1977 | Molari | 428/412 |
| 4,027,073 | 5/1977 | Clark | 428/412 |
| 4,040,882 | 8/1977 | Legrand et al. | 428/412 |
| 4,049,867 | 9/1977 | Ko et al. | 428/412 |
| 4,049,868 | 9/1977 | Laurin et al. | 428/412 |

Primary Examiner—Harold Ansher
Attorney, Agent, or Firm—Jeremiah J. Duggan; Alan H. Spencer

[57] ABSTRACT

Plastic substrates of optical elements having surfaces coated with the abrasion-resistant coating compositions described in U.S. Pat. No. 3,986,997 are improved by utilizing a tie-coat comprising an A-alkylenealkoxysilane where A contains a group reactive with the substrate. For some substrates, particularly polycarbonate lenses, the coating process is substantially simplified by reducing criticality of conditions when the tie-coat of the present invention is used than when the process of the aforementioned patent is followed with the tie-coats conventionally used and disclosed therein.

2 Claims, No Drawings

ABRASION-RESISTANT LENSES AND PROCESS OF MAKING

This application is a continuation-in-part of my co-pending earlier application Ser. No. 717,065, filed Aug. 24, 1976, now U.S. Pat. No. 4,064,308 and of my application Ser. No. 578,793, filed May. 19, 1975, now abandoned.

BACKGROUND OF THE INVENTION

1. Field of the Invention

This invention relates to a novel optical element particularly a novel lens of an organic synthetic polymer having a transparent abrasion-resistant coating adhered thereto and to novel and improved methods of making such coated elements.

2. Description of the Prior Art

Heretofore, methods have been proposed for improving the surface characteristics and scratch resistance of solid organic polymers particularly transparent polymeric materials. In U.S. Pat. Nos. 2,404,426 and 2,404,357, methods are disclosed for coating synthetic polymers particularly methylmethacrylate polymers using an ethyl silicate. It is disclosed that the ethyl silicate can be cross-linked using an amine present in combination with moisture during the drying, baking or aging operations.

Abrasion-resistant coatings are also disclosed in U.S. Pat. No. 3,700,487 in which there is claimed a polycarbonate substrate coated with a lightly cross-linked polyvinyl alcohol coating and U.S. Pat. No. 3,484,157 in which there is disclosed an abrasion-resistant plastic transparent optical element having a directly adhering coating comprising a vinyl polymer cross-linked with a dialdeyde cross-linking agent.

Previous attempts to provide an abrasion-resistant coating have failed to provide a sufficiently abrasion-resistant coating which can be applied from a water solution by a dipping operation in which a substantial thickness of coating is applied to the synthetic organic base material. Prior art coatings have been limited to a relatively thin coating of about 1 micron. Those coatings applied by the technique of spin coating, a method well-known to those skilled in the art are especially limited by the thickness of coating which can be applied in one application. The two problems are solved by the methods and compositions of the present invention. Greater abrasion resistance is provided by the use of a relatively thick coating on the synthetic organic polymer substrate. In addition, the methods and composition of the present invention have overcome the discoloration of some prior art coatings when applied in successive layers. The distinct yellow coloration of prior art coatings is objectionable particularly in an optical element.

U.S. Pat. No. 3,986,997 discloses pigment-free coating compositions used to provide abrasion-resistant coatings, particularly for optical materials. This patent does not describe the tie-coat of the present invention nor a tie-coat similar thereto. Example 6 of the patent teaches utilizing a tie-coat prepared by soaking the substrate in 10% solution of potassium hydroxide overnight or priming the substrate with a silane-modified epoxy primer. In addition, although not described in the patent, it is necessary to carefully control the humidity during the coating of the optical elements according to the process of the patent in order to prepare a product having optical properties commercially acceptable.

SUMMARY OF THE INVENTION

There is provided a process of coating plastic optical substrates, particularly polycarbonate ophthalmic lenses and poly diethyleneglycol bis allyl carbonate ophthalmic lenses using an organoalkoxysilane of the formula

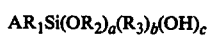

wherein A is $NH_2$, $NHR_2$ or $NHR_1NH_2$ when the lens is a polycarbonate and is

when the lens is a poly diethyleneglycol bis allyl carbonate, $R_1$ is an alkylene having 2 to 10 carbons, $R_2$ and $R_3$ are alkyls having 1 to 4 carbons, $a$ is 0, 1 or 2, $b$ is 0, 1 or 2, $c$ is 1, 2 or 3 and $a+b+c=3$. The "A" portion of the tie coating reacts with the lens material and the hydroxyl group(s) of the tie coating reacts with the abrasion-resistant coating. A preferred tie-coat for polycarbonate lenses is the commercially available gamma-Aminopropyltriethoxysilane. This material is commercially available from Union Carbide under the tradename A-1100 and a related material is available from Dow-Corning under the tradename Z-6020 which has the following formula

These materials are known coupling agents for polycarbonate laminates with glass, such as fibers or sheets. For poly diethyleneglycol bis allyl carbonate lenses (CR-39®) tie-coats with epoxy reactive groups are recommended. Examples of such materials are Union Carbide material A-187 and Dow-Corning material Z-6040. Both of these materials are gamma-Glycidoxypropyltrimethoxysilane.

The tie-coat is applied in any conventional manner from a dilute solution, preferably containing less than 20% of the active material. The application of the tie-coat should be in a manner known to those skilled in the art which will result in a minimum effective tie-coat thickness. While coating thicknesses have not been measured, they are believed to be in the order of 1–10 molecules. One preferred solution used in an immersion process consists of 10% gamma-Aminopropyltriethoxysilane, 85% ethyl alcohol and 5% water. Suitable thicknesses using this solution are obtained when the lenses are immersed for about one minute. However, immersion times exceeding one minute have been found to produce satisfactory coatings.

U.S. Pat. No. 3,986,997 discloses a coating composition and a number of specific examples thereof. These coating compositions are available from Dow-Corning under the tradenames ARC and C-RESIN. The Nov./Dec. 1976 issue of *MATERIAL NEWS* had an article regarding an award in recognition of this significant new technical product.

The abrasion-resistant coating is a pigment-free aqueous coating composition comprising a dispersion of colloidal silica in lower aliphatic alcohol-water solution of the partial condensate of a silanol of the formula RSi(OH)$_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being CH$_3$Si(OH)$_3$, said composition containing 10 to 50 weight percent solids consisting essentially of 10 to 70 weight percent colloidal silica and 30 to 90 weight percent of the partial condensate.

EXAMPLE 1

Injection molded polycarbonate lenses meeting ophthalmic quality standards were treated by immersion at room temperature in a tie-coat solution containing 10% gamma-amino propyl triethoxysilane, 85% ethyl alcohol and 5% water for one minute. The lenses were then removed from the silane solution, rinsed in water and dried.

The period of immersion in the silane solution is not particularly critical. Likewise, the interval between the removal of the lens from the silane solution and rinsing is not critical. In fact, the lenses may dry before rinsing. However, a delay of a day or more could cause the finished coating to be of undue thickness and/or retain an undesirable haze.

We have found that a water rinse subsequent to immersion in the silane solution may be essential for removing haze in the coating. This haze is objectionable in ophthalmic products and a rinse is very desirable. However, in products of limited transmission, such as sunglasses, such haze may not be objectionable and, thus, the water bath may be optional.

The thickness of the tie-coat coating is not critical since only these molecules reacted with the polycarbonate substrate or reacted in turn with a molecule thus reacted, remain as a part of the coating following the rinse. Thicker coatings are undesirable only to the extent they affect the haze of the lens.

The lenses were then coated with an abrasion-resistant coating obtained from Dow-Corning and identified as C-RESIN. Dow-Corning personnel advised the inventors that the material was covered by U.S. Pat. No. 3,986,997. The material was applied to the lenses by dipping in a solution. The C-RESIN was filtered upon receipt, placed in a container and the lenses were immersed and withdrawn at a controlled rate. The rate of withdrawal defines the coating thickness. The rate of withdrawal may be varied from 1–20 inches per minute. The preferred rates being in the order of 4–10 inches per minute. The lenses of this example were withdrawn at the rate of 7½ inches per minute. The lenses were then treated at room temperature. Following drying, they were cured in an air-circulating oven for 8 hours at 250° F. The properties of these lenses, namely, abrasion-resistance, haze and resistance to thermal shock were undetectably equivalent to similarly coated polycarbonate lenses, wherein the abrasion-resistant coating (C-RESIN) was applied under conditions of controlled humidity, i.e. 30% relative humidity or less.

EXAMPLE 2

A second group of polycarbonate lenses were treated with the tie-coat solution according to the solution set forth in Example 1. After rinsing and drying, the tie-coated lenses were treated by immersion in the Dow-Corning ARC composition and withdrawn at a controlled rate of 7½ inches per minute. The coated lenses were then permitted to dry at room temperature and subsequently placed in an air-circulating oven for 8 hours at 250° F. The lenses were of acceptable ophthalmic quality and like those of Example 1, abrasion resistance, haze and resistance to thermal shock were substantially identical with lenses similarly coated in an environment controlled by humidity.

Polycarbonate lenses coated according to the description in U.S. Pat. No. 3,986,997 will only provide comparable adhesion if the polycarbonate lenses are thoroughly dried (4 hours minimum in an air-circulating oven at 240° F.) and the abrasion-resistant coating is applied in an environment having controlled humidity (30%, or less relative humidity).

EXAMPLE 3

Ophthalmic CR-39 ® lenses are immersed for about one minute in a 10% solution of gamma-glycidoxypropyltrimethoxysilane in an aqueous-ethanol mixture having one part water to 17 parts ethyl alcohol adjusted to a pH of 3 to 5 by the addition of acetic acid. After removal, the lenses are rinsed and dried. The CR-39 ® tie-coated lenses have the abrasion-resistant ARC coating applied, dried and cured following the procedure of Example 2.

What is claimed is:

1. In combination, an ophthalmic lens selected from the group consisting of polycarbonate and poly diethyleneglycol bis allyl carbonate lenses; a tie-coating having the formula AR$_1$Si(OR$_2$)$_a$(R$_3$)$_b$(OH)$_c$ wherein A is NH$_2$, NHR$_2$ or NHR$_1$NH$_2$ when the lens is a polycarbonate and is

when the lens is a polydiethyleneglycol bis allyl carbonate, R$_1$ is an alkylene having 2 to 10 carbons, R$_2$ and R$_3$ are alkyl having 1 to 4 carbons, $a$ is 0, 1 or 2, $b$ is 0, 1 or 2, $c$ is 1, 2 or 3 and $a+b+c=3$; the tie-coating being reacted through A with the lens; and an abrasion-resistant coating from immersion of the lens with the tie-coating in a pigment free aqueous coating composition comprising a dispersion of colloidal silica in lower aliphatic alcohol-water solution of the partial condensate of a silanol of the formula RSi(OH)$_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being CH$_3$Si(OH)$_3$, said composition containing 10 to 50 weight percent solids consisting essentially of 10 to 70 weight percent colloidal silica and 30 to 90 weight percent of the partial condensate, the abrasion-resistant coating being reacted with the OH of the tie-coating.

2. The combination of claim 1 wherein the lens is polycarbonate and the tie-coating is gamma-Aminopropyltriethoxy-silane.

* * * * *